United States Patent [19]

Kawaguchi et al.

[11] Patent Number: 4,772,045
[45] Date of Patent: Sep. 20, 1988

[54] GAS BAG APPARATUS FOR VEHICLE

[75] Inventors: Teruhiko Kawaguchi; Teruhiko Koide; Hideyuki Suzuki; Tsutomu Muraoka, all of Aichi, Japan

[73] Assignee: Kabushiki Kaisha Tokai-Rika-Denki-Seisakusho, Japan

[21] Appl. No.: 122,639

[22] Filed: Nov. 10, 1987

Related U.S. Application Data

[63] Continuation of Ser. No. 903,245, Sep. 3, 1986, abandoned.

[30] Foreign Application Priority Data

Sep. 4, 1985 [JP]   Japan ............................ 60-135249

[51] Int. Cl.4 ...................... B60R 21/00; B60R 21/08
[52] U.S. Cl. ..................................... 280/731; 280/728
[58] Field of Search ............... 280/728, 729, 730, 731, 280/736, 739; 297/480, 482

[56] References Cited

U.S. PATENT DOCUMENTS

| | | |
|---|---|---|
| 3,752,501 | 8/1973 | Daniel et al. ...................... 280/731 |
| 3,822,894 | 9/1974 | Muller et al. ...................... 280/731 |
| 3,874,693 | 4/1975 | Patzelt et al. ...................... 280/731 |
| 3,945,665 | 3/1976 | Tsutsumi et al. ..................... 280/731 |
| 3,957,282 | 5/1976 | Finnigan ............................. 297/482 |
| 4,218,073 | 8/1980 | Cymbal .............................. 280/731 |
| 4,449,728 | 5/1984 | Palatzki ............................. 280/731 |
| 4,531,607 | 7/1985 | Browne .............................. 280/730 |

FOREIGN PATENT DOCUMENTS

| | | |
|---|---|---|
| 2035742 | 1/1972 | Fed. Rep. of Germany ...... 280/731 |
| 3126079 | 4/1982 | Fed. Rep. of Germany ...... 280/731 |
| 80732 | 3/1974 | Japan . |

Primary Examiner—Richard A. Bertsch
Attorney, Agent, or Firm—Sixbey, Friedman, Leedom & Ferguson

[57] ABSTRACT

A gas bag apparatus for a vehicle is arranged such that, when an emergency situation of the vehicle occurs, a gas bag body is inflated to absorb the impact applied to the body of an occupant of the vehicle. A soft skin is secured at the peripheral portion thereof to the outer side of the gas body in such a manner that the central portion of the soft skin is movable relative to the outer side of the gas bag body. Accordingly, the occupant's body is prevented from directly rubbing against the outer side of the gas bag body when an emergency situation of the vehicle occurs.

8 Claims, 1 Drawing Sheet

GAS BAG APPARATUS FOR VEHICLE

This application is a continuation of application Ser. No. 903,245, filed 9/3/86, now abandoned.

BACKGROUND OF THE INVENTION

1. Field of the Invention

The present invention relates to a gas bag apparatus for a vehicle which is designed to absorb the impact applied to the occupant's body in an emergency situation of the vehicle.

2. Description of the Related Art

One type of conventional gas bag apparatus for a vehicle has heretofore been arranged such that, when an emergency situation of the vehicle occurs, a gas bag body is inflated with a pressure fluid so as to project in front of the occupant and absorb the inertia force acting on the occupant's body.

This type of conventional gas bag apparatus suffers, however, from the following problem. Namely, when a part of the occupant's body, particularly his face, hits against the gas bag body, it rubs against the surface of the bag body, thus causing an abrasion on the face.

SUMMARY OF THE INVENTION

In view of the above-described circumstances, it is a primary object of the present invention to provide a gas bag apparatus which enables a part of the occupant's body, for example, his face, to be protected from abrasion even when it rubs againt the gas bag body.

To this end, according to the present invention, a soft skin is provided on the outer side of the gas bag body in such a manner that the skin is movable relative to the surface of the bag body.

By virtue of this arrangement, when a part of the occupant's body hits against the inflated gas bag body, the soft skin moves together with the part of the occupant's body while sliding on the surface of the bag body, thereby protecting the skin of the occupant's body, and thus preventing the generation of any abrasion.

DESCRIPTION OF THE PREFERRED EMBODIMENT

The present invention will be described hereinunder in detail with reference to the accompanying drawings.

Figure 1:
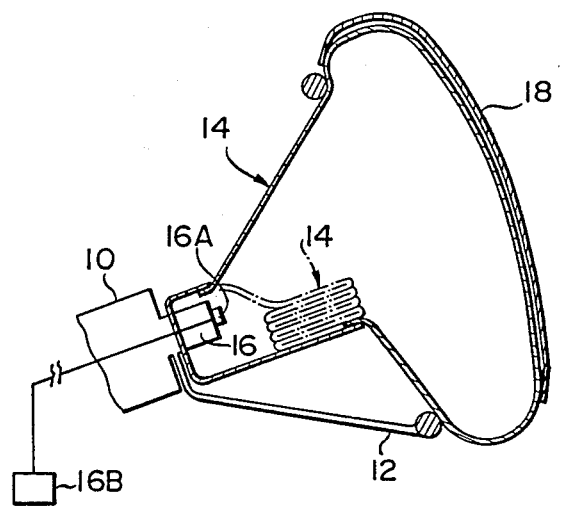
FIG. 1 is a sectional view of one embodiment of the gas bag apparatus according to the present invention, which shows the embodiment in an inflated state.

FIG. 1 shows one embodiment of the gas bag apparatus according to the present invention in which the invention is applied to a steering column 10. A steering wheel 12 is secured to the steering column 10, and a gas bag body 14 is disposed inside the steering wheel 12. When an emergency situation of the vehicle occurs, the gas bag body 14 is inflated to absorb or buffer the impact applied to the body of the occupant, by the pressure of the gas generated by a gas generator 16 which is installed on the steering column 10. When the vehicle is in a normal running state, the gas bag body 14 is folded up as shown by the imaginary line. The gas generator 16 has a valve 16A which is operably or functionally connected to an acceleration sensor 16B. The arrangement is such that, when the acceleration sensor 16B detects an emergency situation of the vehicle, the valve 16A is opened to supply the gas into the gas bag body 14.

It should be noted that the gas bag body 14 is mounted in such a manner that it remains stationary independently of the rotation of the steering wheel 12. One example of such mounting structure is shown in Japanese Patent Laid-Open No. 80732/1974.

Figure 2:
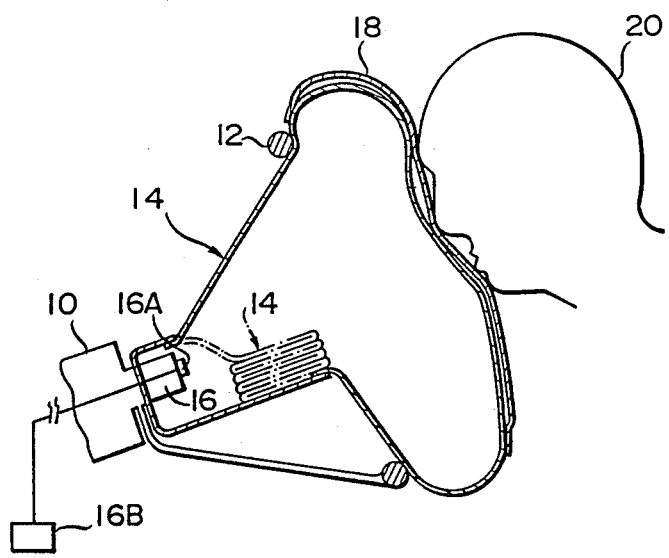
FIG. 2 is a sectional view of the embodiment in a state wherein the occupant's face is in contact with it.

In this embodiment, a soft skin 18 is attached to the surface of a portion or a partial area of the inflated gas bag body 14 on the side thereof which is closer to the occupant. The skin 18 is formed from chamois skin. However, any other soft thin-walled material may be employed for the skin 18. The soft skin 18 is secured at the whole or a part of its periphery to the gas bag body 14 by means, for example, of sewing or bonding using an adhesive, and the intermediate portion of the skin 18 is slidably movable relative to the surface of the gas bag body 14, as shown in FIG. 2 so that it slides over the gas bag body 24 when engaged by the face of the vehicle occupant.

The following is a description of the operation of this embodiment.

When the vehicle runs into an emergency situation, the acceleration sensor 16B detects this and opens the valve 16A of the gas generator 16, thereby generating pressurized gas. In consequence, the folded gas bag body 14 is inflated so as to project toward the side of the steering wheel 12 which is closer to the occupant 20, as shown by the solid line in FIG. 1. As a result, the soft skin 18 is stretched over the surface of a part of the inflated gas bag body 14.

Accordingly, when the body of the occupant 20 is moved toward the gas bag body 14 by the inertia force acting on his body, a part of the occupant's body, for example, his face, hits against the gas bag body 14 through the soft skin 18. Since the body of the occupant 20 is caused to pivot about his waist by the inertia, the occupant's head is forced to move toward the lower side of the vehicle after hitting against the gas bag body 14. In consequence, the frictional force which occurs between the occupant's face and the soft skin 18 causes the skin 18 to move toward the lower side of the vehicle. Since the skin 18 is slidably movable relative to the surface of the gas bag body 14, the skin 18 moves while maintaining the position thereof relative to a part of the occupant's body which is in contact with the skin 18.

Accordingly, the part of the occupant's body, which is in contact with the soft skin 18, does not move relative to the latter, so that there is no fear of a part of his body, for example, the face, receiving an abrasion.

The present invention, which has the above-described arrangement, involves no risk of the occupant's skin directly rubbing against the surface of the gas bag body and therefore enables prevention of generation of any abrasion.

What is claimed is:

1. A gas bag apparatus for protecting a vehicle occupant, comprising:
    an inflatable gas bag body for absorbing the impact applied to the body of an occupant of the vehicle, wherein said gas bag body has an outer surface that faces said occupant when inflated;
    a gas generator connected to the gas bag body for supplying a gas therein upon the occurence of an emergency vehicular situation so as to inflate it; and
    a soft skin means centrally disposed over said outer surface of said gas bag body, said skin means having an edge that circumscribes the periphery of the outer surface of said gas bag 360 degrees, wherein said skin means is secured to said outer surface only around said edges at an angle less than 360 degrees in such a manner that the central portion of said soft skin means is slidably movable relative to the outer surface of said gas bag body when engaged by the body of the occupant;

whereby the occupant's body is prevented from directly rubbing against the outer surface of said gas bag body.

2. A gas bag apparatus according to claim 1, further comprising:

an acceleration sensor for detecting an emergency situation of the vehicle which is operably connected to said gas generator; and a valve provided on said gas generator for releasing the gas into said gas bag body when said acceleration sensor detects an emergency situation of the vehicle.

3. A gas bag apparatus according to claim 1, wherein said soft skin is chamois skin.

4. A gas bag apparatus for protecting the occupant of a vehicle, comprising:

an inflatable gas bag body disposed in a folded manner within a steering column of the vehicle and adapted to be inflated by a shock applied to the vehicle for absorbing the impact applied to the body of the occupant of the vehicle as a result of an emergency vehicular situation, wherein said gas bag body includes an outer surface that faces the occupant when inflated;

a gas generator installed on said steering column and connected to the gas bag body to supply a gas into said gas bag body so as to inflate it; and a soft skin means substantially covering said outer surface of said gas bag body, said skin means having an edge that circumscribes the periphery of the outer surface of said gas bag 360 degrees, wherein said skin is secured to the outer surface of said gas bag body only around said edge at an angle less that 360 degrees in such a manner that the central portion of said soft skin means is slidably movable relative to the outer surface of said gas bag body when engaged by the body of the occupant;

whereby the occupant's body is prevented from directly rubbing against the outer surface of said gas bag body.

5. A gas bag body apparatus according to claim 4, further comprising:

an acceleration sensor for detecting an emergency situation of the vehicle functionally connected with said gas generator; and a valve provided on said gas generator for releasing the gas into said gas bag body when said acceleration sensor detects an emergency situation of the vehicle.

6. A gas bag apparatus according to claim 4, wherein said soft skin is chamois skin.

7. A gas bag apparatus for protecting the occupant of a vehicle from impact forces generated as a result of an emergency vehicular situation, comprising:

a gas bag body disposed within a steering column of the vehicle in a folded up condition, wherein said gas bag body is adapted to be inflated as a result of shock sustained from an emergency vehicular situation in order to absorb the impact applied to the body of the occupant of the vehicle, and wherein said gas bag body includes an outer surface that faces the occupant when inflated;

a gas generator installed on said steering column and connected to the gas bag and adapted to supply a gas into said gas bag body so as to inflate it;

a soft flexible skin means substantially covering said outer surface of said gas bag body, said skin means having an edge that circumscribes the periphery of the outer surface of said gas bag by 360 degrees, wherein said skin means is secured to said outer surface only around said edge in such a manner that the central portion of said soft skin has sufficient slack relative to said outer surface so as to be slidably movable relative to the outer surface of said gas bag body when forcefully engaged against the body of the occupant;

whereby the occupant's body is prevented from directly rubbing against the outer surface of said gas bag body when an emergency situation of the vehicle occurs.

8. A gas bag apparatus according to claim 7, wherein said soft skin is chamois skin.

* * * * *